(12) United States Patent
Takano et al.

(10) Patent No.: US 6,328,840 B1
(45) Date of Patent: *Dec. 11, 2001

(54) PROCESS FOR ADHERING VULCANIZED RUBBERS AND PROCESS FOR PRODUCING RUBBER PRODUCTS USING SAID PROCESS FOR ADHERING

(75) Inventors: Nobukazu Takano, Yokohama; Shingo Kato, Tokyo; Hiroshi Takada, Yokohama; Shingo Iizumi, Yokohama; Masanao Ieyoshi, Yokohama, all of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,956

(22) Filed: Jan. 5, 1998

Related U.S. Application Data

(63) Continuation of application No. 08/547,291, filed on Oct. 24, 1995, now abandoned.

(30) Foreign Application Priority Data

| | | |
|---|---|---|
| Oct. 27, 1994 | (JP) | 6-263821 |
| Mar. 9, 1995 | (JP) | 7-49509 |
| Mar. 9, 1995 | (JP) | 7-49510 |
| Apr. 26, 1995 | (JP) | 7-102029 |
| Jul. 19, 1995 | (JP) | 7-182509 |
| Jul. 19, 1995 | (JP) | 7-182510 |

(51) Int. Cl.$^7$ .................................................. B32B 31/00
(52) U.S. Cl. .......................... 156/219; 156/137; 156/153; 156/249; 156/303.1; 156/304.5; 156/307.1; 156/307.3
(58) Field of Search .................................. 156/249, 219, 156/303.1, 304.5, 307.1, 153, 307.3, 137

(56) References Cited

U.S. PATENT DOCUMENTS

| | | | |
|---|---|---|---|
| 3,650,874 | * 3/1972 | Job et al. | 156/306.9 |
| 3,933,565 | 1/1976 | Printz et al. | |
| 4,450,252 | * 5/1984 | Fieldhouse | 156/153 |
| 5,759,322 | * 6/1998 | Courel et al. | 156/153 |

FOREIGN PATENT DOCUMENTS

| | | | |
|---|---|---|---|
| 469801 | * 8/1937 | (GB) | 156/307.3 |
| 56-30844 | * 3/1981 | (JP) | 156/307.3 |
| Y2-57-23363 | 2/1982 | (JP) . | |
| A 63-139807 | 6/1988 | (JP) . | |
| 63-139807 | * 6/1988 | (JP) | 156/219 |
| B2-3-35098 | 5/1991 | (JP) . | |
| U-5-12410 | 2/1993 | (JP) . | |
| U-5-12411 | 2/1993 | (JP) . | |
| A-6-226850 | 8/1994 | (JP) . | |
| 943262 | * 7/1982 | (SU) | 156/219 |

* cited by examiner

Primary Examiner—John J. Gallagher
(74) Attorney, Agent, or Firm—Oliff & Berridge, PLC

(57) ABSTRACT

A processes for adhering a vulcanized rubber to a vulcanized rubber or an unvulcanized rubber. Adhesion of vulcanized rubbers to each other is conducted by using at least one of the vulcanized rubbers before vulcanization thereof according to steps of: (1) laminating a sheet material which can easily be peeled from a surface of a rubber after vulcanization to a rough surface of the rubber before vulcanization, (2) vulcanizing a resultant laminate, (3) removing the sheet material from the vulcanized laminate immediately before adhesion of the vulcanized rubber in the laminate to another vulcanized rubber, and (4) adhering the vulcanized rubbers to each other according to a method of adhesion. The adhering of the vulcanized rubbers to each other is also conducted by using a rubber composition for adhesion inserted between the vulcanized rubbers without procedures using the sheet material. An unvulcanized rubber is used in place of another vulcanized rubber in the process for adhering a vulcanized rubber and an unvulcanized rubber to each other. A rubber composition for adhesion which contains sulfur in an amount greater than that of the vulcanized rubber may be used in the method of adhesion. Various types of rubber products, such as a large size rubber weir, a steep slope conveyor belt, a rubber gasket used for a joint portion of immersed elements for an immersed tunnel, and a retreaded tire, can be produced by using the processes for adhering.

3 Claims, 11 Drawing Sheets

3 DUMBBELL, JAPANESE INDUSTRIAL STANDARD; UNIT:mm

FIG. 14A  FIG. 14B
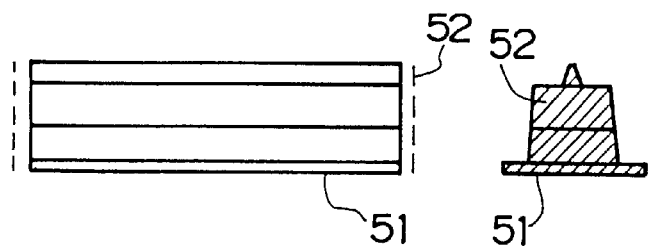
FIG. 15A  FIG. 15B
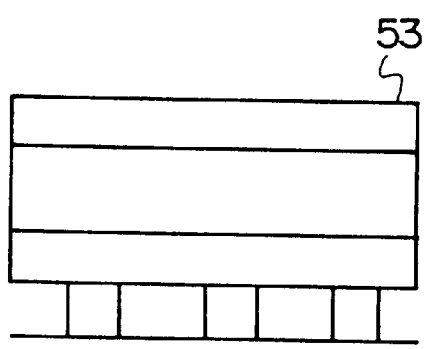 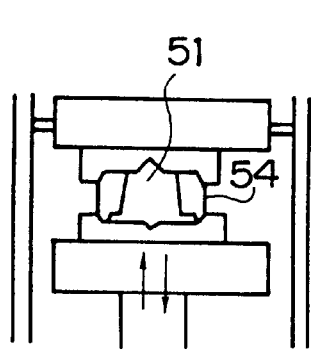
FIG. 16
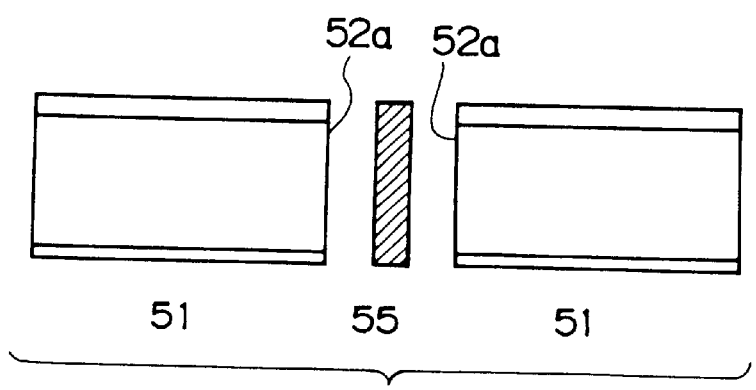

PROCESS FOR ADHERING VULCANIZED RUBBERS AND PROCESS FOR PRODUCING RUBBER PRODUCTS USING SAID PROCESS FOR ADHERING

This is a continuation of application Ser. No. 08/547,291 filed Oct. 24, 1995, now abandoned. The entire disclosure of the prior application(s) is hereby incorporated by reference herein in its entirety.

FIELD OF THE INVENTION

The present invention relates to a process for adhering vulcanized rubbers to each other and a process for adhering a vulcanized rubber and an unvulcanized rubber. The present invention also relates to processes for producing various types of rubber products, such as a large size rubber weir, a steep slope belt conveyor, a rubber gasket used for a joint portion of immersed elements for an immersed tunnel, and a retreaded tire, by using the processes for adhering.

PRIOR ART OF THE INVENTION

Heretofore, as a process for adhering vulcanized rubbers to each other, such as a process used for producing a conveyor belt or a rubber track having an endless structure by bonding two end portions of an intermediate product having ends, processes comprising the steps of treating surfaces for adhering vulcanized rubbers with buffing to form a rough surface, coating the treated surfaces with an adhesive composition such as a rubber cement, inserting an unvulcanized rubber between the coated surfaces, and vulcanizing the resultant laminate, are generally and frequently used.

However, it is difficult to completely remove dust formed by the treatment of buffing when a surface of a vulcanized rubber is treated with buffing, and the dust remaining on the surface makes it difficult to achieve complete adhesion. The conventional processes have another problem that the working environment deteriorates because coating of the surface for adhesion with an adhesive material such as a rubber cement is necessary. In a process intended to solve the problem, the surface for adhesion of a rubber article is left in an unvulcanized condition while other parts of the article are vulcanized, and then, the unvulcanized surface is brought into contact with a similar unvulcanized surface of another article of a vulcanized rubber, and the two articles of vulcanized rubbers are bonded to each other by vulcanizing them together.

However, the process described above has drawbacks in that demolding of the article having the unvulcanized surface after vulcanization of the other parts is difficult because of the unvulcanized condition of the surface, and that, when for example an article is made into an endless form, handling of the unvulcanized surface and operations of the adhesion must be conducted with extreme care because the unvulcanized part is tacky.

A process for adhering a vulcanized rubber and an unvulcanized rubber to each other is used, for example, in a process for producing a slope conveyor belt or the like. For producing a slope conveyor belt, a flat conveyor belt is prepared in advance. For preparation of a slope conveyor belt, rubber parts which are used for making an uneven surface structure necessary for a slope belt, such as rubber cleats, are attached in an unvulcanized condition to the vulcanized flat conveyor belt which has been prepared in advance. The flat belt and the rubber parts are then bonded to each other by vulcanization. In conventional processes for producing a rubber product having an uneven structure like a slope conveyor belt, producing the rubber product integrally in a single step causes problems that a large amount of investment or a large area is required to install facilities for vulcanizing the product, that conditions of the operation become extremely complicated, and that it is very difficult to achieve uniform vulcanization. Therefore, products such as those described above are produced according to the steps comprising preparing a simpler vulcanized rubber product such as a flat conveyor belt in advance, then preparing parts of protrusion and other parts forming the uneven structure, such as cleats of a slope conveyor belt and the like, by using unvulcanized rubbers, and subsequently bonding the vulcanized rubber product and the parts of protrusion of unvulcanized rubbers to each other by vulcanizing together. In processes generally and frequently used for adhering a vulcanized rubber and an unvulcanized rubber such as those used in the processes described above, the surface for adhesion of a vulcanized rubber is coated with an adhesive composition such as a rubber cement after the surface is treated with buffing to form a rough surface, and then an unvulcanized rubber is attached to the coated surface and vulcanized to achieve the adhesion.

However, the process for adhering a vulcanized rubber and an unvulcanized rubber has the same problems as those in the process for adhering vulcanized rubbers to each other described above. Furthermore, when an unvulcanized rubber containing sulfur in the same amount as that in the vulcanized rubber is used, sulfur migrates from the unvulcanized rubber to the vulcanized rubber through the interface of adhesion during and after the process for adhering, and decrease in the hardness (decrease in the adhesive strength) at the surface of adhesion occurs.

Prior arts relating to processes for producing various rubber products which require a process for adhering vulcanized rubbers to each other or a process for adhering a vulcanized rubber and an unvulcanized rubber as an indispensable step are described in the following.

A rubber weir of a bag shape expands due to fluid being filled therein and forms a weir across a river. It contracts due to discharge of the fluid therefrom and allows river water flow freely. Production of a large size rubber weir requires a large amount of investment for production facilities, such as a large area for production and equipments of large sizes when the rubber weir is produced by vulcanizing it as a integral single body. Therefore, according to heretofore disclosed processes (Japanese Patent Publication No. Heisei 3(1991)-35098, Japanese Patent Application Laid-Open No. Heisei 6(1994)-226850), a large size rubber weir is generally produced by preparing weir segments which are portions of the rubber weir formed by dividing the rubber weir in the circumferential direction, and then are bonded to each other. Each weir segment is prepared by adhering vulcanized rubber plates containing a reinforcing fabric to each other (for example, part 26 in FIG. 8).

A stepped structure is used in both processes described above in order to increase adhesion of end portions of the rubber plates as is shown in FIG. 9. A stepped structure is formed at the end portions of the rubber plates 011 which have been vulcanized, and the rubber fragment at the stepped structure is removed. A rubber sheet 012 containing a reinforcing fabric or an unvulcanized rubber containing a reinforcing fabric which has a shape fitting the stepped structure of the rubber plates is prepared separately. The rubber sheet (through an unvulcanized rubber when the rubber sheet has been vulcanized) or the unvulcanized rubber is fitted to a depression formed by abutting the two end parts of the rubber plates having the stepped structure as is shown in FIG. 5. A rubber weir segment is prepared by bonding the rubber plates to each other through adhesion of the components of the resultant laminate by vulcanization. The processes described above have a big problem in the bonding of rubber plates to each other.

In the processes described above, a process for forming the stepped structure at the end portion of the rubber plate 011 which has been vulcanized is necessary. It is important in the process for forming the stepped structure that adhesion by vulcanization which does not cause separation or fracture at the surface of adhesion is achieved by separating layers in the rubber plate exactly at a rubber layer between reinforcing layers when the stepped structure is formed, and by fitting the vulcanized rubber sheet containing a reinforcing fabric or the unvulcanized rubber sheet 012 containing a reinforcing fabric (in recent processes) exactly to the surface of the stepped structure.

In order to separate layers in the rubber plate exactly at a rubber layer, the process for the formation of the stepped structure heretofore contains a procedure of peeling part 12 in FIG. 3 by fully employing an apparatus or a technique specially developed for this purpose. The operation of this procedure takes a considerable time because it is required that the peeling be achieved very accurately and the operation must be conducted very slowly in order to achieve satisfactory separation at a rubber layer.

Furthermore, when the rubber plates and the rubber of the same type fitting the stepped structure are used for the adhesion by vulcanization in the bonding of the rubber plates, the following problems arise. (1) When the rubber plates and the rubber fitting the stepped structure are both vulcanized rubbers containing a reinforcing material, the rubbers are bonded together by vulcanization using an unvulcanized rubber placed between them. In this case, the part of adhesion by vulcanization is in an overcured condition, and this causes decrease in stiffness at the part of adhesion. Therefore, the rubber plates bonded to each other are not smoothly bent to the shape of a rubber weir. (2) When the vulcanized rubber plate is brought into contact with an unvulcanized rubber which contains a reinforcing material and prepared according to the same formulation as that of the rubber plates and the rubber plate and the unvulcanized rubber are bonded together by vulcanization, migration of sulfur from the unvulcanized rubber to the vulcanized rubber takes place. Adhesive strength at the interface of adhesion decreases due to this phenomenon, and the decrease in adhesive strength causes separation of the adhesion.

Next, in the process for production of a conveyor belt by adhesion of additional parts, which contain a rubber as the main component thereof and have a shape different from that of the conveyor belt, to the surface of the conveyor belt, particularly in the process for production of a steep slope conveyor belt which has flanges and cleats on the surface of the belt and can transfer powder materials from a lower position to a higher position or from a higher position to a lower position, the following processes have heretofore been conducted for adhesion of a flange or a cleat to the base belt: (1) a process in which a flange or a cleat vulcanized in advance is bonded to the base belt by using a room temperature vulcanizing agent; (2) a process in which a flange or a cleat is bonded to the base belt while the flange or the cleat is vulcanized with heating; and (3) a process in which a flange or a cleat vulcanized in advance is bonded to the base belt with bolts or screws.

When process (1) or (2) described above is conducted, the surfaces for adhesion of the vulcanized base belt and the vulcanized flange or cleat are treated with buffing to enhance the adhesive strength. When the adhesion is conducted by vulcanization, the surface for adhesion treated with buffing is coated only with a rubber cement, and a rubber composition for adhesion is not generally used between the parts for adhesion (Japanese Utility Model Application Laid-Open Nos. Heisei 5(1993)-12410 and Heisei 5(1993)-12411, Japanese Utility Model Publication Showa 57(1982)-23363).

However, the processes described above have the following problems or drawbacks.

(1) When the size of the belt is increased, a large amount of working is required for the treatment of buffing in the process of adhesion of a flange, a cleat or the like described above, and equipments specially made for this treatment are necessary in some cases.

(2) The working environment deteriorates by the treatment of buffing because of generation of dust or the like.

(3) Easiness of the treatment of buffing must be taken into consideration for the rubber material used in the process, and this requirement tends to make it difficult to use a rubber having a good abrasion resistance which is required for a belt material.

(4) The process in which a flange or a cleat is bonded to the base belt by bolts or screws is inferior in durability of the product because of concentration of stress to limited parts of the product during use. The bolts and screws used also cause increase in weight. Furthermore, the bolts and screws tend to be corroded when the product is frequently used in an outdoor atmosphere.

(5) When a rubber material similar to that of the base belt is used for a flange or a cleat in the adhesion by vulcanization, migration of a crosslinking agent contained in the rubber materials takes place during the vulcanization, and weak portions are formed in the interface of adhesion. This phenomenon causes inferior durability.

A rubber gasket which is inserted between end parts of immersed elements forming an immersed tunnel joins the immersed elements to each other in water and serves as a primary seal which seals the immersed tunnel to prevent penetration of water. In the process for producing the rubber gasket used for a joint portion of immersed elements, the following process is generally used. A gasket of this type is generally very long. A rubber gasket as long as or longer than 100 m is often used. Therefore, for the production of the rubber gasket, gasket parts having a shape formed by dividing a rubber gasket in the longitudinal direction are generally prepared with a vulcanized rubber because of restriction by a curing press which generally has a length of about several meters, and adhesion of the resultant gasket parts to each other at the divided faces produces a rubber gasket.

In a generally adopted conventional process for adhering gasket parts, the surface for adhesion is coated with a rubber cement or the like after the surface has been treated with buffing, and an unvulcanized rubber sheet similar to the vulcanized gasket part is placed between the faces for adhesion. Then, the gasket parts and the rubber sheet are bonded together by vulcanization. This process for adhesion has the same problems as those in the adhesion of a vulcanized rubber and a vulcanized rubber described above.

Heretofore, a retreaded tire is produced from a base tire in which grooves on the patterned part (the tread part) are diminished by abrasion after use for a long time and a newly prepared precured tread having newly formed grooves. The base tire and the precured tread are bonded to each other through a rubber composition for adhesion placed between them, and an integrally formed body is made from them by vulcanization. The resultant retreaded tire can be used again.

In the process for production of a retreaded tire, the surfaces for adhesion of the newly prepared precured tread and the base tire are treated with buffing in advance in order to achieve tight adhesion between both surfaces of adhesion. Then, the unvulcanized rubber composition for adhesion is placed between both surfaces for adhesion, and the combined rubbers are vulcanized to produce a retreaded tire.

However, the process described above has the following problems.

(1) A large amount of working is required for the treatment of buffing of the surfaces for adhesion of the precured tread and the base tire, and equipments specially made for this treatment are necessary in some cases.

(2) The working environment deteriorates by the treatment of buffing because of generation of dust and the like.

(3) Easiness of the treatment of buffing must be taken into consideration for the rubber material used for the precured tread, and this requirement tends to make it difficult to use a rubber having a good abrasion resistance.

(4) A rubber compound similar to the rubber at the part for adhesion of the base tire is generally used as the unvulcanized rubber composition for adhesion in order to achieve tight adhesion of the base tire and the precured tread to each other by vulcanization. Under this condition, migration of a crosslinking agent takes place from the rubber composition for adhesion to the base tire or from the rubber composition for adhesion to the precured tread during the vulcanization. This phenomenon causes formation of portions having a lower adhesive strength at the interface of adhesion, and the possibility that the whole or a portion of the part of adhesion has inferior durability arises.

SUMMARY OF THE INVENTION

An object of the present invention is to provide a process for adhering vulcanized rubbers to each other.

Another object of the present invention is to provide a process for adhering a vulcanized rubber and an unvulcanized rubber to each other.

Still another object of the present invention is to provide processes for producing rubber products, such as a large size rubber weir, a steep slope conveyor belt, a rubber gasket for a joint portion of immersed segments, a retreaded tire, and the like, which are simplified by using the processes for adhering described above and provide the rubber products with increased adhesive strength between rubber parts.

(1) The process for adhering vulcanized rubbers to each other in the present invention comprises the step of: (1) laminating a sheet material to at least one of the rubber to be vulcanized, before said rubber is vulcanized, on a surface of said rubber which surface is to be used for adhesion and which is a rough surface, said sheet material being easily peelable from said rubber after said rubber has been vulcanized, (2) vulcanizing the resultant laminate of the rubber before vulcanization and the sheet material, (3) removing the sheet material or the sheet material having rubber vulcanizate residue from the vulcanized laminate immediately before adhesion of the vulcanized rubber in the laminate to another vulcanized rubber of the same type as or a different type than the above-prepared vulcanized rubber, and (4) adhering the vulcanized rubbers to each other in accordance with a method of adhesion.

(2) The process for adhering vulcanized rubbers to each other in the present invention also comprises the step of: adhering vulcanized rubbers to each other by vulcanizing a laminate formed by inserting, between the vulcanized rubbers, a rubber composition for adhesion containing sulfur in an amount greater than the amount of sulfur contained in the vulcanized rubbers.

(3) The process for adhering a vulcanized rubber and an unvulcanized rubber to each other in the present invention comprises the steps of: (1) laminating a sheet material to the rubber to be vulcanized, before said rubber is vulcanized, on a surface of said rubber which surface is to be used for adhesion and which is a rough surface, said sheet material being easily peelable from said rubber after said rubber has been vulcanized, (2) vulcanizing the resultant laminate of the rubber before vulcanization and the sheet material, (3) removing the sheet material or the sheet material having rubber vulcanizate residue from the vulcanized laminate immediately before adhesion of the vulcanized rubber in the laminate to an unvulcanized rubber of the same type as or a different type than the above-prepared vulcanized rubber, and (4) adhering the vulcanized rubber and the unvulcanized rubber to each other by vulcanization in accordance with a method of adhesion.

(4) The process for adhering a vulcanized rubber and an unvulcanized rubber to each other in the present invention also comprises the step of: adhering a vulcanized rubber and an unvulcanized rubber to each other by vulcanizing a laminate formed by inserting, between the vulcanized rubber and the unvulcanized rubber, a rubber composition for adhesion containing sulfur in an amount greater than the amount of sulfur contained in the vulcanized rubber or in the unvulcanized rubber.

(5) The process for producing a large size rubber weir in the present invention comprises producing a weir segment by adhering vulcanized rubber plates to each other in accordance with the processes for adhering described above.

(6) The process for producing a steep slope belt conveyor in the present invention comprises bonding a belt of a vulcanized rubber with flanges of a vulcanized rubber or an unvulcanized rubber, and cleats of a vulcanized rubber or an unvulcanized rubber in accordance with the processes for adhering described above.

(7) The process for producing a rubber gasket for a joint portion of immersed segments in the present invention comprises bonding parts of a gasket of a vulcanized rubber to each other in accordance with the processes for adhering described above.

(8) The process for producing a retreaded tire in the present invention comprises bonding a vulcanized rubber of a precured tread for a retreaded tire and a vulcanized rubber of a base tire in accordance with the processes for adhering described above.

BRIEF DESCRIPTION OF THE DRAWINGS

FIG. 14A is a schematic front view of a part of a rubber gasket.

FIG. 14B is a schematic side view of a part of the rubber gasket.

FIG. 15A is a schematic front view illustrating a process for vulcanization of a part of a rubber gasket.

FIG. 15B is a schematic side view illustrating a process for vulcanization of a part of the rubber gasket.

FIG. 16 is a schematic sectional view illustrating a process for bonding of a vulcanized rubber parts forming a rubber gasket to each other.

DETAILED DESCRIPTION OF THE INVENTION

Figure 1:
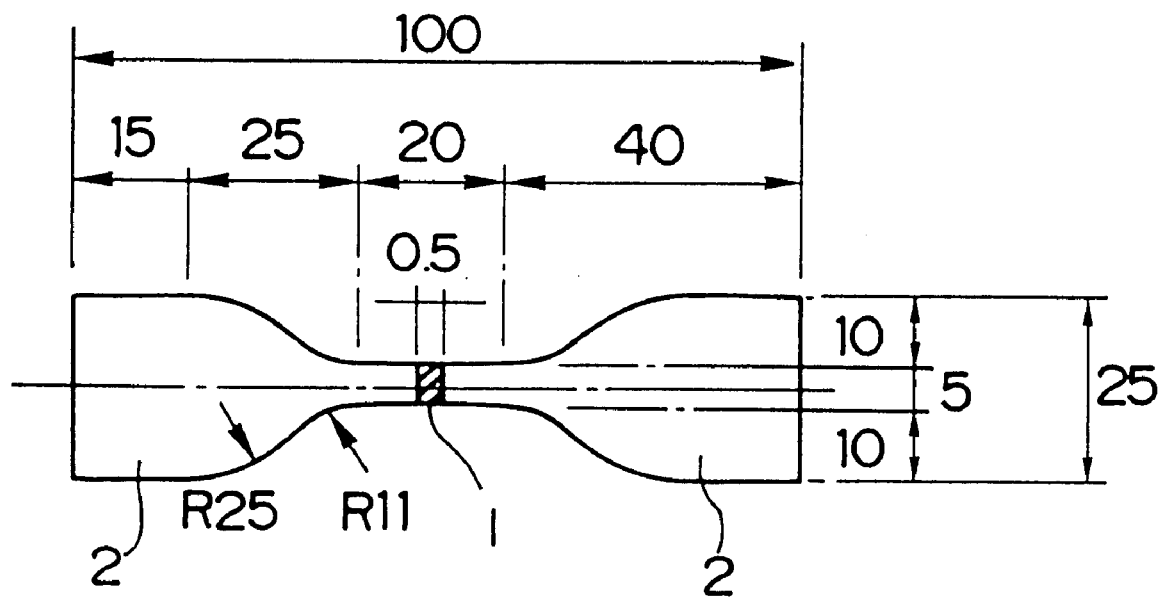
FIG. 1 is a schematic view showing a #3 dumbbell used for the tensile test in accordance with the method of Japanese Industrial Standard K 6301.

The process for adhering vulcanized rubbers to each other of the present invention comprises adhering vulcanized rubbers to each other, the process comprising the step of: (1) laminating a sheet material to at least one of the rubbers to be vulcanized, before the rubber is vulcanized, on a surface of the rubber which surface is to be used for adhesion and which is a rough surface, the sheet material being easily peelable from the rubber after the rubber has been vulcanized (the sheet material has $R_y$ (the maximum height of the surface roughness) in the range of 1 to 5000 μm, preferably 20 to 200 μm, and is used in order to obtain a clean and rough surface after vulcanization of the rubber), (2) vulcanizing the resultant laminate of the rubber before vulcanization and the sheet material, (3) removing the sheet material or the sheet material having rubber vulcanizate residue from the vulcanized laminate immediately before adhesion of the vulcanized rubber in the laminate to another vulcanized rubber, the surface of the vulcanized rubber being easily obtained in a condition suitable for adhesion because a rough surface is formed in a similar shape to that obtained by the treatment of buffing and also dust and the like which are generally formed by the treatment of buffing are absent, and (4) adhering the vulcanized rubbers to each other in accordance with a method of adhesion. According to the process described above, an adhesion stronger than that obtained by conventional processes can be obtained more easily without having problems persistent in the conventional processes.

In the method of adhesion, an adhesive material, such as a rubber cement or the like, a rubber composition for adhesion, or the like, can be used. A rubber composition for adhesion is preferable. When a rubber composition for adhesion is used, it is necessary that the content of sulfur in 100 parts by weight of rubber in the rubber composition for adhesion be greater than the content of sulfur in 100 parts by weight of rubber in each of the vulcanized rubber, preferably by 1 to 10 parts by weight.

The sheet material is not particularly limited as long as the material is sufficiently durable under the condition of vulcanization of rubber (temperature×time) and can be easily peeled from a vulcanized rubber. It is preferred that the sheet material is a material which forms on the surface of a vulcanized rubber a rough shape similar to that of the surface formed by the treatment of buffing after the sheet material is peeled from the vulcanized rubber. Preferable examples of the sheet material include fabric and the like materials. More preferable examples of the sheet material include high dense fabric and the like materials.

The process for adhering vulcanized rubbers to each other of the present invention also includes a process for adhering vulcanized rubbers to each other by vulcanizing a laminate formed by inserting, between the vulcanized rubbers, a rubber composition for adhesion without using the sheet material. In this process for adhering, the rubber composition for adhesion specified above is inserted between vulcanized rubbers having the surfaces which have been treated with buffing or treated with buffing and then coated with a rubber cement, and the resultant laminate is vulcanized to achieve the adhesion. It is necessary in this process that dust formed by the treatment of buffing be thoroughly removed from the surfaces of the vulcanized rubbers.

The mechanism of adhesion in the process for adhering vulcanized rubbers to each other is described in the following. A sheet material which can be easily peeled from the surface of the rubber after the rubber has been vulcanized is attached in advance to the rubber before vulcanization having rough surface on the surface used for adhesion after the rubber is vulcanized, and the resultant laminate is vulcanized. By peeling the sheet material from the surface of the vulcanized rubber immediately before conducting the adhesion, a rough shape suitable for adhesion can be obtained on the surface of the vulcanized rubber, and furthermore the surface can be obtained in a fresh condition.

In conventional processes for adhesion in which a surface formed by molding is used for adhesion, ingredients mixed with a rubber, such as oils, waxes, antioxidants, and the like, bleed out at the surface of the vulcanized rubber as time elapses, and the substances bleeded out at the surface behave as inhibiting factors to adhesion. In contrast, the problem described above can be overcome by the process of the present invention because the sheet material is peeled immediately before the adhesion.

The characteristics of the process for adhering a vulcanized rubber and a vulcanized rubber of the present invention are (1) that a surface having a suitable roughness (the anchor effect) can be obtained on a surface of vulcanized rubbers used for the adhesion more easily than by the conventional treatment of buffing, and (2) that the surface for adhesion can be obtained easily in a clean (bleedless) condition.

Another of the characteristics of the process for adhering a vulcanized rubber and a vulcanized rubber of the present invention is that, in the process using a rubber composition for adhesion, a higher adhesive strength can be obtained by using a rubber composition for adhesion containing sulfur in an amount greater than that in the vulcanized rubbers which are bonded to each other. It is particularly preferred that the difference in the contents is 1 to 10 PHR. When the difference in the contents of sulfur is less than 1.0 PHR, modulus is decreased by migration of sulfur from the rubber composition for adhesion to the vulcanized rubbers to cause decrease in the adhesive strength. When the difference in the contents of sulfur is more than 10 PHR, physical properties of the rubber composition for adhesion deteriorate, and decrease in the adhesive strength is caused.

The process for adhering a vulcanized rubber and an unvulcanized rubber to each other of the present invention comprises adhering a vulcanized rubber and an unvulcanized rubber to each other, the process comprising the step of: (1) laminating a sheet material to the rubber to be vulcanized, before said rubber is vulcanized, on a surface of said rubber which surface is to be used for adhesion and which is a rough surface, said sheet material being easily peelable from said rubber after said rubber has been vulcanized (the sheet material has $R_y$ in the range of 1 to 5000 $\mu$m, preferably 20 to 200 $\mu$m, and is used in order to obtain a clean and rough surface after vulcanization of the rubber), (2) vulcanizing the resultant laminate of the rubber before vulcanization and the sheet material, (3) removing the sheet material or the sheet material having rubber vulcanizate residue from the vulcanized laminate immediately before adhesion of the vulcanized rubber in the laminate to an unvulcanized rubber, the surface of the vulcanized rubber being easily obtained in a condition suitable for adhesion because a rough surface is formed in a similar shape to that obtained by the treatment of buffing and also dust and the like which are generally formed by the treatment of buffing are absent, and (4) adhering the vulcanized rubber and the unvulcanized rubber to each other in accordance with a method of adhesion. According to the process described above, an adhesion stronger than that obtained by conventional processes can be obtained more easily without having problems persistent in the conventional processes.

The method of adhesion, the rubber composition for adhesion, and the sheet material used in the process for adhering a vulcanized rubber and an unvulcanized rubber are the same as those described in the process for adhering a vulcanized rubber and a vulcanized rubber except that the rubber bonded to the vulcanized rubber is an unvulcanized rubber.

The process for adhering a vulcanized rubber and an unvulcanized rubber of the present invention also includes a process for adhering a vulcanized rubber to an unvulcanized rubber by vulcanizing a laminate formed by inserting a rubber composition for adhesion between the vulcanized rubber and the unvulcanized rubber. In this process for adhering, the rubber composition for adhesion specified in the process for adhering a vulcanized rubber and a vulcanized rubber is inserted between the unvulcanized rubber and the vulcanized rubber having the surface which has been treated with buffing or treated with buffing and then coated with a rubber cement, and the resultant laminate is vulcanized to achieve the adhesion. It is necessary in this process that dust formed by the treatment of buffing be thoroughly removed from the surfaces of the vulcanized rubbers.

The mechanism of adhesion and the characteristics of the process for adhering a vulcanized rubber and an unvulcanized rubber are the same as those of the process for adhering a vulcanized rubber and a vulcanized rubber except that the rubber bonded to the vulcanized rubber is an unvulcanized rubber.

Examples of the process for adhering vulcanized rubbers to each other are shown in Examples 1 and 2 and Comparative Examples 1 to 3 which follow.

EXAMPLE 1

A fabric made of PET [a high dense fabric](250D/1 (203 strands/5 cm)×250D/2 (122 strands/5 cm)) was laminated at least to the part used for adhesion before vulcanization of an unvulcanized rubber, and the laminate of the unvulcanized rubber and the fabric was vulcanized together. Another laminate was prepared by the same procedure.

After the laminates were vulcanized, the fabric in each laminate was peeled immediately before adhesion of the vulcanized rubbers to each other. A rubber composition for adhesion containing 6 PHR of sulfur was inserted between the vulcanized rubbers, and the vulcanized rubbers were bonded to each other by vulcanization.

EXAMPLE 2

Adhesion of a vulcanized rubber and a vulcanized rubber was conducted by the same procedures as those in Example 1 except that a fabric was not used and that the surface for adhesion was treated with buffing and coated with a rubber cement.

Comparative Example 1

Adhesion of a vulcanized rubber and a vulcanized rubber was conducted by the same procedures as those in Example 1 except that a fabric was not used, and that the surface formed by a mold was used as the surface for adhesion without any treatment.

Comparative Example 2

Adhesion of a vulcanized rubber and a vulcanized rubber was conducted by the same procedures as those in Example 1 except that a rubber composition for adhesion containing 2 PHR of sulfur was used.

Comparative Example 3

Adhesion of a vulcanized rubber and a vulcanized rubber was conducted by the same procedures as those in Example 1 except that a rubber composition for adhesion containing 13 PHR of sulfur was used.

The adhesive strength and the fatigue strength of the vulcanized rubbers bonded to each other in the examples and the comparative examples described above were measured. The results are shown in Table 1.

TABLE 1

| Example | 1 | 2 | — | — | — |
|---|---|---|---|---|---|
| Comparative Example | — | — | 1 | 2 | 3 |
| adhesive strength (kgf/cm$^2$) | 205 | 203 | 170 | 175 | 185 |
| fatigue strength (number of repeating) | $5.0 \times 10^5$ | $4.8 \times 10^5$ | $7.1 \times 10^3$ | $2.1 \times 10^3$ | $7.8 \times 10^4$ |

For the measurement of the adhesive strength and the fatigue strength, a rubber composition for adhesion of 0.5 mm thickness was inserted between two vulcanized rubbers, and the resultant laminate was vulcanized. The total thickness of the sample laminate was adjusted to 2 mm by using a slicer. A test piece containing the vulcanized rubbers 2 and the rubber composition for adhesion 1 was punched out from the resultant laminate in a shape shown in FIG. 1. The adhesive strength and the fatigue strength (the number of repeating of elongation from 0% to 100% until the sample was broken) were measured according to the methods of Japanese Industrial Standard K 6301.

The formulations of the vulcanized rubber and the rubber composition for adhesion used in the above examples and comparative examples are shown in Table 2.

TABLE 2

| vulcanized rubber | | rubber composition for adhesion | |
|---|---|---|---|
| NR | 100 | NR | 100 |
| carbon black | 50 | carbon black | 50 |
| aromatic oil | 10 | aromatic oil | 10 |
| sulfur | 2 | sulfur | varied |
| vulcanization accelerator | 1 | vulcanization accelerator | 1 |
| zinc oxide | 3 | zinc oxide | 3 |

Note: Vulcanization accelerator: N-tert-butyl-2-benzothiazyl-sulfenamide

A sheet material which could be easily peeled from a surface of a rubber after vulcanization was laminated to a surface of the rubber before vulcanization having a rough surface at least at the part used for adhering a vulcanized rubber and a vulcanized rubber later. The resultant laminate was then vulcanized. When the sheet material which could be easily peeled such as a fabric was peeled from the vulcanized rubber immediately before the adhesion to another vulcanized rubber, a roughness suitable for adhesion was obtained on the surface of the vulcanized rubber. The surface obtained was also in a fresh condition. Thus, an adhesive strength as high as that obtained by conventional processes using the treatment of buffing and a rubber cement could be obtained more easily than the conventional processes.

Furthermore, when vulcanized rubbers treated at the part of adhesion to facilitate the adhesion were bonded to each other as described above, a still higher adhesive strength was obtained by the process using a rubber composition for adhesion which contained sulfur in an amount greater than the vulcanized rubbers. In this process, a laminate was formed by inserting the rubber composition for adhesion between the vulcanized rubbers, and the resultant laminate was vulcanized together.

Examples of the process for adhering a vulcanized rubber and an unvulcanized rubber are shown in Examples 3 and 4 and Comparative Examples 4 to 7 which follow.

EXAMPLE 3

A fabric made of PET [a high dense fabric](250D/1 (203 strands/5 cm)×250D/2 (122 strands/5 cm)) was laminated at least to the part used for adhesion before vulcanization of an unvulcanized rubber, and the laminate of the unvulcanized rubber and the fabric was vulcanized together.

After the laminate was vulcanized, the fabric in the laminate was peeled immediately before adhesion to an unvulcanized rubber. A rubber composition for adhesion containing 6 PHR of sulfur was inserted between the vulcanized rubber and the unvulcanized rubber, and the rubbers were bonded to each other by vulcanization.

EXAMPLE 4

Adhesion of a vulcanized rubber and an unvulcanized rubber was conducted by the same procedures as those in Example 3 except that a fabric was not used and that the surface for adhesion was treated with buffing and coated with a rubber cement.

Comparative Example 4

Adhesion of a vulcanized rubber and an unvulcanized rubber was conducted by the same procedures as those in Example 3 except that a fabric was not used and that the surface formed by a mold was used as the surface for adhesion without any treatment.

Comparative Example 5

Adhesion of a vulcanized rubber and an unvulcanized rubber was conducted by the same procedures as those in Example 3 except that a rubber composition for adhesion containing 2 PHR of sulfur was used.

Comparative Example 6

Adhesion of a vulcanized rubber and an unvulcanized rubber was conducted by the same procedures as those in Example 3 except that a rubber composition for adhesion containing 13 PHR of sulfur was used.

Comparative Example 7

Adhesion of a vulcanized rubber and an unvulcanized rubber was conducted by the same procedures as those in Example 3 except that a rubber composition for adhesion was not used.

The adhesive strength and the fatigue strength of the vulcanized rubbers bonded to each other in the examples and the comparative examples described above were measured. The results are shown in Table 3.

TABLE 3

| Example | 3 | 4 | — | — | — | — |
|---|---|---|---|---|---|---|
| Comparative Example | — | — | 4 | 5 | 6 | 7 |
| adhesive strength (kgf/cm$^2$) | 200 | 198 | 165 | 190 | 175 | 190 |
| fatigue strength (number of repeating) | $5.0 \times 10^5$ | $4.9 \times 10^5$ | $6.5 \times 10^3$ | $3.8 \times 10^4$ | $6.2 \times 10^4$ | $4.0 \times 10^4$ |

The adhesive strength and the fatigue strength were measured according to the same methods as those in Example 1.

The formulations of the vulcanized rubber, the unvulcanized rubber, and the rubber composition for adhesion used in the above examples and comparative examples are shown in Table 4.

TABLE 4

|  | vulcanized rubber | unvulcanized rubber | rubber composition for adhesion |
|---|---|---|---|
| NR | 100 | 70 | 100 |
| SBR | — | 30 | — |
| carbon black | 50 | 50 | 50 |
| aromatic oil | 10 | 10 | 10 |
| sulfur | 2 | 2 | varied |
| vulcanization accelerator | 1 | 1 | 1 |
| zinc oxide | 3 | 3 | 3 |

Note: Vulcanization accelerator: N-tert-butyl-2-benzothiazyl-sulfenamide

A sheet material which could be easily peeled from a surface of a rubber after vulcanization was laminated to a surface of the rubber before vulcanization (in the unvulcanized condition) having a rough surface at least at the part used for adhesion of a vulcanized rubber and an unvulcanized rubber later. The resultant laminate was then vulcanized. When the sheet material which could be easily peeled such as a fabric was peeled from the vulcanized rubber immediately before the adhesion to an unvulcanized rubber, a roughness suitable for adhesion was obtained on the surface of the vulcanized rubber. The surface obtained was also in a fresh condition. Thus, an adhesive strength higher than that obtained by conventional processes using the treatment of buffing and a rubber cement could be obtained more easily than the conventional processes without having the problems of dust remaining after the treatment of buffing and deterioration of the working environment by the rubber cement.

Furthermore, a still higher adhesive strength was obtained by the process using a rubber composition for adhesion which contained sulfur in an amount greater than the vulcanized rubber or the unvulcanized rubber.

Examples of the processes for producing various rubber products, such as a large size rubber weir, a steep slope conveyor belt, a rubber gasket for a joint portion of immersed segments, and a retreaded tire, by using the process for adhering a vulcanized rubber and a vulcanized rubber and/or the process for adhering a vulcanized rubber and an unvulcanized rubber described above are described in the following. However, rubber products which can be produced by using the processes for adhering of the present invention are not limited to those shown in examples.

1. A Process for Producing a Large Size Rubber Weir

Figure 8:
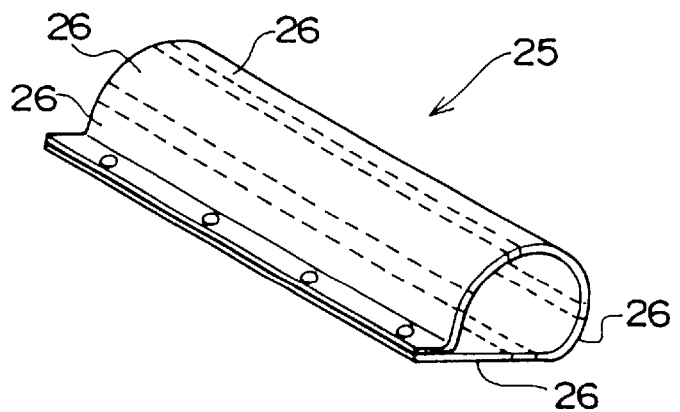
FIG. 8 is a partial perspective view or another example of the rubber weir shown in FIG. 7.
Figure 9:
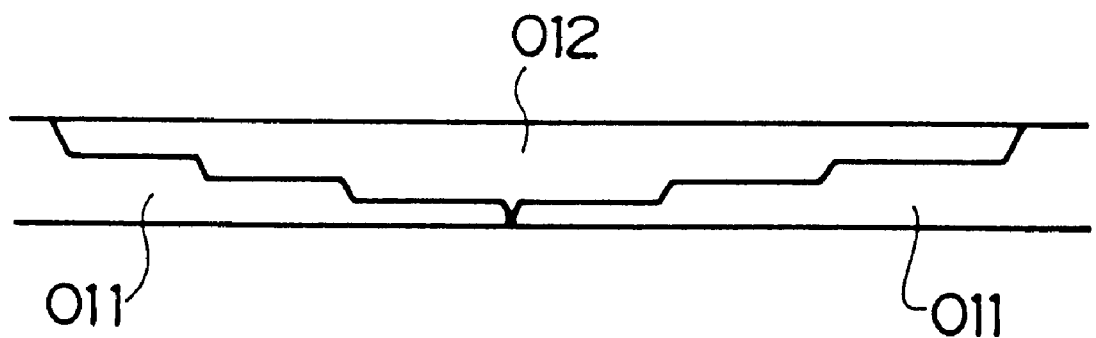
FIG. 9 is a sectional side view of bonded parts in a weir segment of a rubber weir which are bonded in accordance with a conventional process for adhering.

In a process for producing a large size rubber weir which expands due to fluid being filled therein and contracts due to discharge of the fluid therefrom, in which two or more weir segments which are portions of the rubber weir respectively obtained by dividing the rubber weir in the circumferential direction are bonded to each other, each weir segment is produced by adhering two or more vulcanized rubber plates containing a reinforcing fabric to each other, as is shown by part 26 in FIG. 8.

Said adhering of the two or more vulcanized rubber plates to each other comprises the steps of: (1) forming a tapered structure or a stepped structure at end portions of the rubber plates before vulcanization in order to increase the surface area for adhesion, roughening the surface of the formed structure, and laminating a sheet material which can easily be peeled from a surface of a rubber after vulcanization to the roughened surface, (2) vulcanizing the resultant laminate of the vulcanized rubber and the sheet material, (3) removing the sheet material together with the rubber fragment at the tapered structure or the rubber fragment at the stepped structure adhering to the sheet material immediately before adhesion of the vulcanized rubber in the laminate to vulcanized rubber sheets containing a reinforcing fabric or to unvulcanized rubber sheets containing a reinforcing fabric and unvulcanized rubber sheets, and (4) setting the end portions of respective vulcanized rubber plates in contact with each other, laminating said rubber sheets to the surface of the contacting end portions of the vulcanized rubber plates in such a manner that the rubber sheets extend over both contacting end portions and fill a depression formed at said tapered structures or stepped structures, and adhering the end portions of the rubber plates and the rubber sheets to each other by a method of adhesion.

In step (3) described above, the sheet material can be easily peeled from the end portion of the rubber plates having the stepped structure, and the stepped structure can be formed with accuracy. Therefore, this step can be remarkably simplified.

The method of adhesion is the same as that described above. The process for adhering by vulcanization using a rubber composition for adhesion is preferable as the method of adhesion. When a rubber composition for adhesion is used, it is preferred that the content of sulfur per 100 parts by weight of rubber in the rubber composition for adhesion is greater than the content of sulfur per 100 parts by weight of rubber in the vulcanized rubber of the rubber plates, or the vulcanized or unvulcanized rubber sheet containing a reinforcing fabric and the unvulcanized rubber sheet by 1 to 5 parts by weight.

The sheet material used in the process for production of a large size weir is the same as that described above. A fabric or the like material is used preferably.

The process for production of a large size weir of the present invention also includes adhering the rubber plates described above to each other, the adhering comprising the steps of: (1) forming a tapered structure or a stepped structure at end portions of the rubber plates before vulcanization in order to increase the surface area for adhesion, and vulcanizing the rubber plates, (2) setting the end portions of respective vulcanized rubber plates in contact with each other, and laminating the vulcanized rubber sheets containing a reinforcing fabric or unvulcanized rubber sheets containing a reinforcing fabric and unvulcanized rubber sheets to the surface of the contacting end portions of the vulcanized rubber plates in such a manner that the rubber sheets extend over both contacting end portions and fill a depression formed at said tapered structures or stepped structures, and (3) adhering the end portions of the rubber plates and the rubber sheets to each other by vulcanization using a rubber composition for adhesion.

The rubber composition for adhesion contains sulfur in an amount described above.

In the adhesion of vulcanized rubber plates described above to each other, a fabric or the like material which can be easily peeled from the vulcanized rubber is placed at the end portion of the rubber plate before vulcanization on the surface which is formed into the stepped structure after vulcanization, and the part not included in the stepped structure at the end portion is filled with a rubber so that the end portion has the full shape of the rubber plate. Then, the whole rubber plate is vulcanized. By peeling the fabric or the like material placed in the end portion from the rubber plate together with the rubber fragment at the stepped structure adhering to the sheet material after the vulcanization, a stepped structure can be formed accurately and easily.

Furthermore, the surface formed by the peeling is a rough surface suitable for adhesion which is similar to that obtained by the treatment of buffing in accordance with conventional processes (the treatment of buffing is indispensable in conventional processes). The resultant surface is also in a fresh condition.

Therefore, one of the characteristics of the process for adhering rubber plates is that (1) roughness suitable for adhesion (the anchor effect) and (2) a normal condition (bleedless) can be realized easily on the surface of the vulcanized rubber at least at the part used for adhesion when the surface is formed by peeling the fabric.

Another of the characteristics of the process for adhering rubber plates is that the adhesion of rubber plates to each other is conducted by inserting an unvulcanized rubber composition for adhesion along the surface of adhesion between the rubber plates and the rubber sheets which fit the stepped structure and fill a depression formed at the tapered structures or stepped structures at the end portion of the rubber plate, and the rubber composition for adhesion contains sulfur in an amount greater than that of the vulcanized rubber plates or the rubber sheet by 1 to 5 parts by weight. When the content of sulfur in the rubber composition for adhesion is the same as or smaller than that of the rubber plates, decrease in modulus is caused by migration of sulfur from the rubber composition for adhesion to the vulcanized rubber, and the adhesive strength is decreased.

The process for production of a large size weir is described with reference to an example shown in FIGS. 2 to 9. However, the present invention is, of course, not limited to the example.

Figure 2:
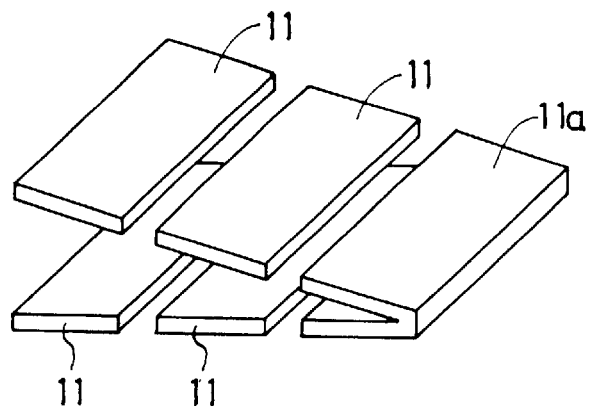
FIG. 2 is a perspective view of rubber plates forming a segment of a rubber weir as an example of the rubber products in the present invention.
Figure 3:
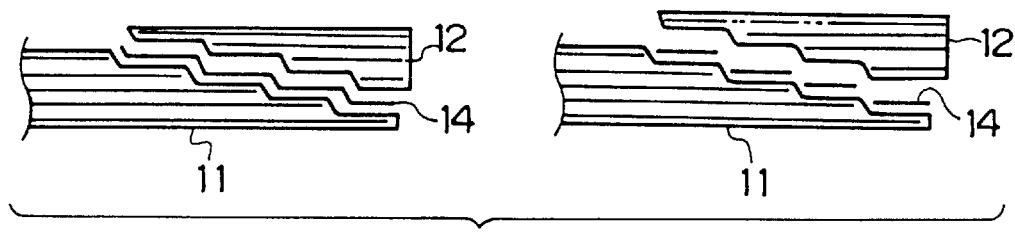
FIG. 3 is a sectional side view of an end portion of a rubber plate, illustrating components related to the adhesion in the condition that they are separated.

Vulcanized rubber plates 11 which form the upper part and the lower part of a segment of a rubber weir shown in FIG. 2 are prepared first. In the preparation, a high dense fabric (made of PET) 14 which can be easily peeled from the rubber after vulcanization is placed along the surface of the unvulcanized rubber plate which forms a stepped structure after vulcanization by peeling the fabric, and the remaining part not included in the stepped structure is filled with a rubber. Then, the unvulcanized rubber plate thus formed is vulcanized. The vulcanized rubber plate 11 has a shape of a rectangular plate. The rubber plate 11a at the folding part has a shape formed by folding a rectangular plate into a double layer sheet. Then, the high dense fabric and the rubbers which fill the remaining part at both end portions of the vulcanized rubber plates 11 and are bonded to the fabrics are peeled together from the vulcanized rubber plate. The peeling operation can be easily conducted because the high dense fabric can be easily peeled from the vulcanized rubber (refer to FIG. 4).

The surface 14a formed by the peeling has a rough shape suitable for adhesion, and an additional treatment of surface such as buffing is not necessary.

Figure 4:
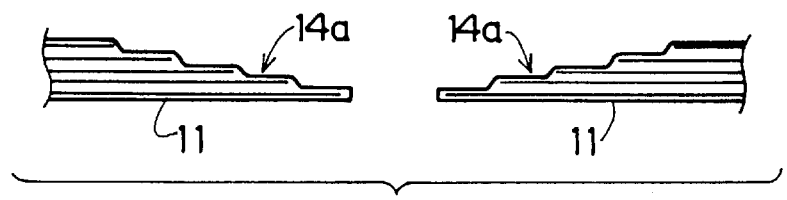
FIG. 4 is a sectional side view of end portions of rubber plates formed to a stepped structure by removing rubber fragment at the stepped structure.
Figure 5:
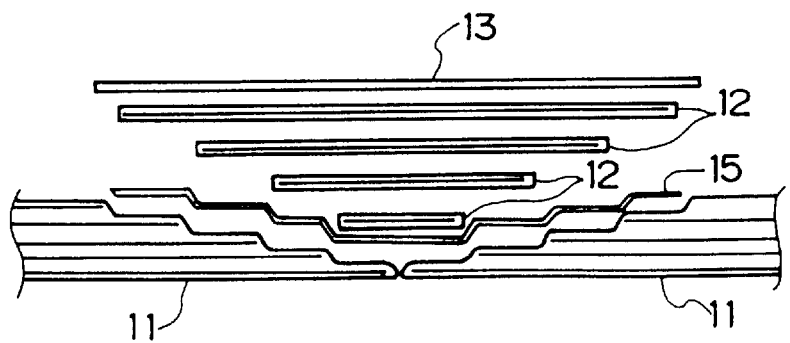
FIG. 5 is a sectional side view of the part of adhesion, illustrating components related to the adhesion in the condition that they are separated.
Figure 6:
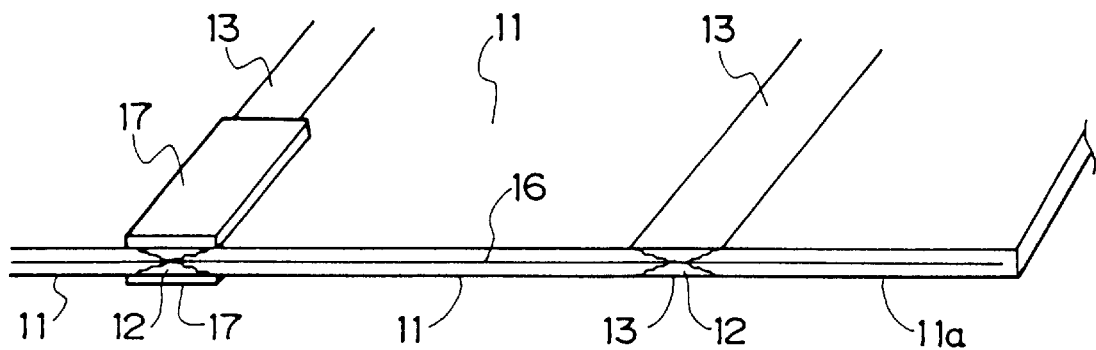
FIG. 6 is a partial perspective view of a rubber weir segment at the time of adhesion by vulcanization.

When the rubber plates 11 are abutted to each other at the end portions, the space between the rubber plates has a reversed stepped structure in which the space is narrowest at the position of the contact and becomes broader stepwise in the upward direction from the position of the contact (FIG. 4). A rubber sheet of a thickness of about 0.5 mm containing sulfur in an amount greater than that of the vulcanized rubber plates, for example by 3 PHR, is laminated to the whole surface along the stepped structure. Next, rubber composition for adhesion 15 and unvulcanized rubber sheets containing a reinforcing fabric 12 are successively fitted to the rubber plates successively from a lower layer to a higher layer in the space. At the outermost layer, an unvulcanized rubber sheet for the outermost layer 13 is laminated to adjust the total thickness (refer to FIG. 5). Upper vulcanized rubber plates 11 and lower vulcanized rubber plates 11 which are both bonded by rubber sheets 12 and 13 containing a reinforcing fabric at the parts of bonding to each other are laminated with a release sheet 16 inserted between them (refer to FIG. 6)

The folded part of the rubber plate 11a is disposed at one end. Vulcanized rubber plates 11 are bonded successively to each folded sheets of the rubber plate. The other ends of the combined vulcanized rubber plates are left open. The parts of bonding in the upper combined vulcanized rubber plates come to the same positions as those in the lower combined vulcanized rubber plates. Heated plates 17 for vulcanization press the parts of bonding from the upper and lower positions to achieve the adhesion by vulcanization. The adhesion by vulcanization is conducted simultaneously in the upper and lower rubber plates.

Figure 7:
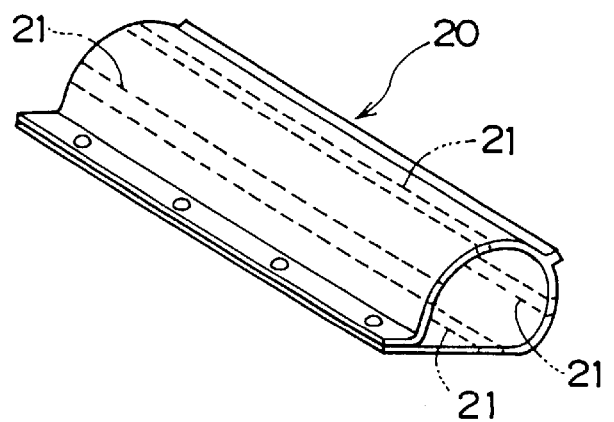
FIG. 7 is a partial perspective view of a rubber weir produced in the example in the condition that the rubber weir is fixed to a river bed and expanded, and a part of the weir segment is shown in a sectional view.

The large size rubber weir 20 formed by joining the weir segments of the vulcanized rubber thus prepared is settled in a river to the up-stream direction by fixing the open end parts of the upper and lower rubber plates together to the river bed across the river. The large size rubber weir expands when a fluid such as air or water is introduced to the inside of the rubber weir 20 having the parts of bonding 21 of the rubber plates. The rubber weir expands as is shown in FIG. 7, and controls the flow of the river. The rubber weir contracts by discharge of the fluid. Thus, the flow of the river can be adjusted to a desired condition.

In the example describe above, the rubber weir has the folded structure. The process of the present invention can also be applied to a rubber weir having a structure which is constituted with a single sheet of a bag shape and has no folding. As is shown in FIG. 8, the rubber weir 25 is formed by joining a rubber weir segment which is prepared by successively bonding vulcanized rubber plates 26 having no folding by vulcanization without using a folded rubber plate.

EXAMPLE 5

The formulations of the rubber compositions used in the production of a rubber weir are shown in Table 5.

TABLE 5

|  | rubber for vulcanized rubber plate (part by weight) | rubber composition for adhesion (part by weight) |
| --- | --- | --- |
| NR | 40 | 100 |
| SBR | 60 | — |
| carbon black | 50 | 45 |
| antioxidant | 2 | 2 |
| zinc oxide | 4 | 4 |
| stearic acid | 2 | 2 |
| process oil | 10 | — |
| sulfur | 2 | 5 |
| vulcanization accelerator | 1.8 | 1 |

For producing a rubber weir, so-called reinforced unvulcanized rubber sheets were prepared from, for example, about four sheets by successively laying one sheet on top of another, and the resultant laminate was vulcanized. The reinforced unvulcanized rubber sheet was prepared by incorporating a reinforcing material, such as a fabric treated with dipping in order to increase adhesion with a rubber used as the matrix, into an unvulcanized rubber (W=3 m, t=1 mm, L=the length of the weir) having physical properties satisfying requirements of the rubber weir, such as the unvulcanized rubber having a formulation shown in Table 5, Before vulcanizing the laminate, a high dense fabric 14 which can be easily removed from the rubber after vulcanization was placed along the surface of the stepped structure at the end portion of the rubber plate, and the remaining part not included in the stepped structure was filled with a rubber, as described above. After the resultant laminate was vulcanized, a vulcanized rubber plate having the stepped structure at the end portion thereof was obtained by peeling the high dense fabric from the vulcanized rubber together with the rubber filling the remaining space (refer to FIG. 4).

Then, the vulcanized rubber plates prepared as described above were abutted to each other at the end portions. A sheet of a rubber composition for adhesion containing sulfur in an amount greater than that of the vulcanized rubber plate by 1 to 5 PHR as is shown in Table 5 was laminated along the surface of the stepped structure at the end portions, and vulcanized rubber sheets containing a reinforcing fabric, or unvulcanized rubber sheets containing a reinforcing fabric and unvulcanized rubber sheets were further laminated to fill the space above the stepped structures of the both ends. The resultant laminate was vulcanized for adhesion (refer to FIGS. 5 and 6).

As has been shown in detail in the above, an advantage is that the procedure of forming a structure having an increased surface area, such as the stepped structure, at the end portion of a vulcanized rubber plate could be conducted easily. This procedure requires a large amount of labor and time in conventional processes. For example, forming this structure in conventional processes requires peeling with a force of as high as 15 kg/cm by using a facility and an apparatus specialized for this procedure carefully at a peeling speed of as slow as 2.3 m/hour. In contrast, according to the process of the present invention, a high dense fabric which can be easily peeled from a rubber was laid along the surface which formed the stepped structure by peeling before the rubber plate was vulcanized, and the stepped structure could be formed by peeling the high dense fabric instantaneously with a force of 0.2 kg/cm (by hands). Thus, the time required to form the stepped structure could be remarkably reduced.

Another advantage is that adhesive strength of the bonding between the vulcanized rubber plates could be increased by adhesion of the vulcanized rubber plates using a sheet of a rubber composition for adhesion containing sulfur in an amount greater than that of the vulcanized rubber plates by 1 to 5 PHR.

2. A Process for Producing a Steep Slope Conveyor Belt

A process for producing a steep slope belt conveyor which transfers powder materials from a lower position to a higher position or from a higher position to a lower position, comprises the step of: adhering two endless flanges of a vulcanized rubber to an endless belt of a vulcanized rubber at transverse direction end portions of the endless belt, and adhering a plurality of cleats of a vulcanized rubber to the endless belt between the two endless flanges at given intervals in a longitudinal direction of the endless belt, in accordance with the process for adhering vulcanized rubbers to each other described above using the vulcanized rubber of the endless belt, the vulcanized rubber of the endless flanges, and the vulcanized rubber of the cleats as the vulcanized rubbers.

The process for adhering the vulcanized rubber of the endless belt to the vulcanized rubbers of the endless flanges and the cleats comprises the step of: (1) laminating a sheet material to at least one of the rubbers to be vulcanized, before said rubber is vulcanized, on a surface of said rubber which surface is to be used for adhesion and which is a rough surface, said sheet material being easily peelable from said rubber after said rubber has been vulcanized, (2) vulcanizing the resultant laminate of the rubber before vulcanization and the sheet material, (3) removing the sheet material or the sheet material having rubber vulcanizate residue from the vulcanized laminate immediately before adhesion of the vulcanized rubber in the laminate to the vulcanized rubber of the endless flange and the vulcanized rubber of the cleat, and (4) adhering the vulcanized rubber of the endless belt to the vulcanized rubber of the endless flange and the vulcanized rubber of the cleat in accordance with a method of adhesion.

In step (3) described above, a surface suitable for adhesion (a surface similar to that treated by buffing) can be instantaneously obtained by peeling the sheet material from the vulcanized rubber immediately before adhering the vulcanized rubbers to each other.

The method of adhesion is the same as that described above. The adhesion by vulcanization using a rubber composition for adhesion is preferable. When a rubber composition for adhesion is used, it is preferred that the content of sulfur per 100 parts by weight of rubber in the rubber composition for adhesion is greater than the content of sulfur per 100 parts by weight of rubber in each of the vulcanized rubbers by 1 to 5 parts by weight.

The sheet material is the same as that described above. A fabric or the like material is preferably used.

In the process for producing a steep slope conveyor belt described above, it is preferred that the adhesion of the vulcanized rubber of the base belt to the vulcanized rubber of the flange and the vulcanized rubber of the cleat can be conducted by vulcanizing a laminate formed by inserting a rubber composition for adhesion between the vulcanized rubber of the base belt and the vulcanized rubber of the endless flange or the vulcanized rubber of the cleat.

It is preferred that the content of sulfur per 100 parts by weight of rubber in the rubber composition for adhesion is greater than the content of sulfur per 100 parts by weight of rubber in each of the vulcanized rubbers by 1 to 5 parts by weight.

The process for producing a steep slope conveyor belt of the present invention described above also includes adhering the rubber of the endless belt to the rubber of the endless flange and the rubber of the cleat in accordance with the process for adhering a vulcanized rubber and an unvulcanized rubber described above by using the vulcanized rubber of the endless belt, the unvulcanized rubber of the endless flange, and the unvulcanized rubber of the cleat.

The process for adhering the vulcanized rubber of the endless belt to the unvulcanized rubbers of the endless flanges and the cleats comprises the step of: (1) laminating a sheet material to the rubber to be vulcanized, before said rubber is vulcanized, on a surface of said rubber which surface is to be used for adhesion and which is a rough surface, said sheet material being easily peelable from said rubber after said rubber has been vulcanized, (2) vulcanizing the resultant laminate of the rubber before vulcanization and the sheet material, (3) removing the sheet material or the sheet material having rubber vulcanizate residue from the vulcanized laminate immediately before adhesion of the vulcanized rubber in the laminate to the unvulcanized rubber of the endless flanges and the unvulcanized rubber of the cleats, and (4) adhering the vulcanized rubber to the unvulcanized rubber of the endless flanges and the unvulcanized rubber of the cleats by vulcanization in accordance with a method of adhesion.

The method of adhesion is the same as that described above. The adhesion by vulcanization using a rubber composition for adhesion is preferable. When a rubber composition for adhesion is used, it is preferred that the content of sulfur per 100 parts by weight of rubber in the rubber composition for adhesion is greater than the content of sulfur per 100 parts by weight of rubber in the vulcanized rubber or the unvulcanized rubbers by 1 to 5 parts by weight.

The sheet material is the same as that described above. A fabric or the like material is preferably used.

In the process for producing a steep slope conveyor belt described above, it is preferred that the adhesion of the vulcanized rubber of the base belt to the vulcanized rubber of the endless flange or the vulcanized rubber of the cleat can be conducted by vulcanizing a laminate formed by inserting a rubber composition for adhesion between the vulcanized rubber of the base belt and the unvulcanized rubber of the endless flange or the unvulcanized rubber of the cleat. It is preferred that the content of sulfur per 100 parts by weight of rubber in the rubber composition for adhesion is greater than the content of sulfur per 100 parts by weight of rubber in the vulcanized rubber or the unvulcanized rubbers by 1 to 5 parts by weight.

In the adhesion of the vulcanized rubber of the belt and the vulcanized rubber of the endless flange or the cleat, a fabric or the like material which can be easily peeled from the vulcanized rubber is placed on the surface of the rubber of the endless belt before vulcanization at the part used for the adhesion later. The remaining surface of the sheet material is covered with a rubber, and then the rubber for the endless belt is vulcanized. By peeling the fabric or the like material from the vulcanized rubber together with the vulcanized rubber covering it after the vulcanization, a rough surface suitable for adhesion which is similar to that obtained by the treatment of buffing according to conventional processes (the treatment of buffing is indispensable in conventional processes) is obtained, and the resultant surface is also in a fresh condition.

Therefore, one of the characteristics of the process for adhering the vulcanized rubber of the endless belt to the vulcanized rubber of the endless flange or the cleat is that (1) roughness suitable for adhesion (the anchor effect) and (2) a normal condition (bleedless) can be realized easily on the surface of the vulcanized rubber at least at the part used for adhesion when the surface is formed by peeling the fabric. Another of the characteristics of the process for adhering the vulcanized rubber of the endless belt to the vulcanized rubber of the endless flange or the cleat is that the adhesion is conducted by inserting along the surface of adhesion an unvulcanized rubber composition for adhesion containing sulfur in an amount greater than that of the vulcanized rubbers by 1 to 5 parts by weight. When the content of sulfur in the unvulcanized rubber composition for adhesion is the same as or smaller than that of the vulcanized rubber of the endless belt, decrease in modulus is caused by migration of sulfur from the unvulcanized rubber composition for adhesion to the vulcanized rubber, and the adhesive strength is decreased.

The process of the present invention has been described mainly with reference to a steep slope conveyor belt. However, the process of the present invention can naturally be applied for production of belts having structures in which cleats alone, longitudinal cleats alone, flanges alone, or parts of various shapes are bonded to the base belt, and production of belts having other various structures, as well.

The process for production of a steep slope conveyor belt is described with reference to an example shown in FIGS. 10 to 13. However, the present invention is, of course, not limited to the example.

EXAMPLE 6

Figure 10:
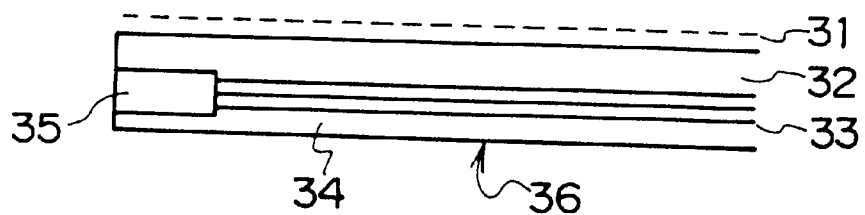
FIG. 10 is a schematic sectional view to illustrate forming of a base belt.
Figure 11A:
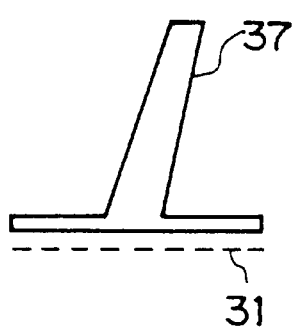
FIG. 11A is a schematic sectional view of a cleat.
Figure 11B:
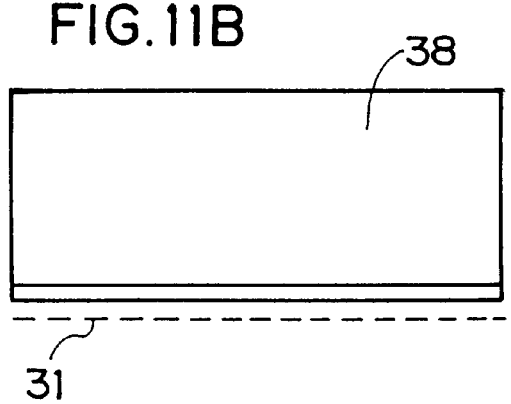
FIG. 11B is a schematic sectional view of a flange.

At first, a base belt 36 which had an upper cover rubber 32, a lower cover rubber 34, a reinforcing fabric 33 inserted between the two cover rubbers, a high dense fabric 31, and an edge rubber 35, was formed as is shown in FIG. 10. In the forming, a high dense fabric (made of PET) 31 which can be easily peeled from a vulcanized rubber was placed on the surface of the upper cover rubber 32 at least at the part to which a flange or a cleat was bonded in a later step, and the remaining surface of the high dense fabric was covered with a rubber. Then, the laminate was vulcanized. When cleats 37 and flanges 38 were bonded to the base belt after they had been vulcanized, a high dense fabric 31 was placed on the surface for adhesion of the cleats and the flanges, and the remaining surface of the high dense fabric was covered with a rubber as is shown in FIGS. 11A and 11B. The laminate was then vulcanized.

In the next step, the high dense fabric placed under the surface for adhesion was peeled. The high dense fabric could be easily peeled because the high dense fabric had the property of being easily peeled. The surface 31a formed by the peeling did not need the treatment of buffing because the surface had a rough shape suitable for adhesion.

Figure 12A:
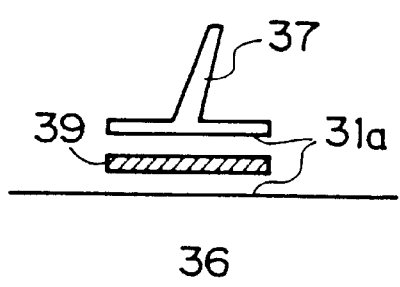
FIG. 12A is a schematic view illustrating a process for adhering a base belt to a cleat.
Figure 12B:
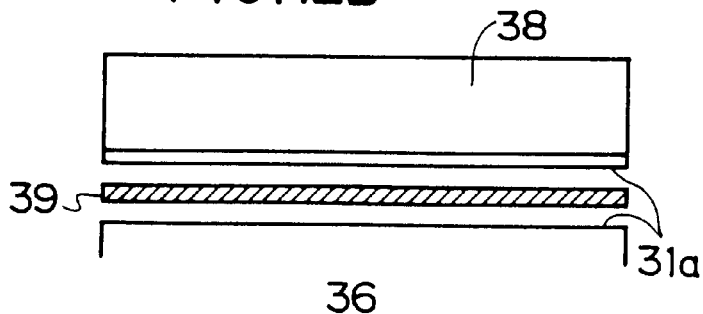
FIG. 12B is a schematic view illustrating a process for adhering a base belt to a flange.

Then, a sheet of a rubber composition for adhesion 39 of about 0.5 mm thickness containing sulfur in an amount greater than that of the base belt, the flanges, and the cleats, for example by 3 PHR, was laminated to the whole area of the surface for adhesion, and the adhesion of the resultant laminate was conducted by vulcanization (refer to FIGS. 12A and 12B).

An adhesive material of a room temperature curing type may also be used in place of the rubber composition for adhesion 39. However, the adhesive strength obtained in this case is considerably lower than that obtained by using a rubber composition for adhesion.

A flange or a cleat of an unvulcanized rubber may also be used. In this case, it is not necessary in order to form the surface of adhesion that a high dense fabric is attached on the flange or the cleat and peeled off later.

The formulations used for the production of the steep slope conveyor belt in the present example are shown in Table 6.

TABLE 6

| material for compounding | rubber of base belt, cover rubber, flange rubber, cleat rubber (part by weight) | unvulcanized rubber sheet = rubber composition for adhesion (part by weight) |
|---|---|---|
| NR | 80 | 100 |
| SBR | 20 | — |
| carbon black | 50 | 40 |
| antioxidant | 2 | 2 |
| zinc oxide | 4 | 4 |
| stearic acid | 2 | 2 |
| process oil | 15 | — |
| sulfur | 2 | 5 |
| vulcanization accelerator | 1 | 1 |

Figure 13:
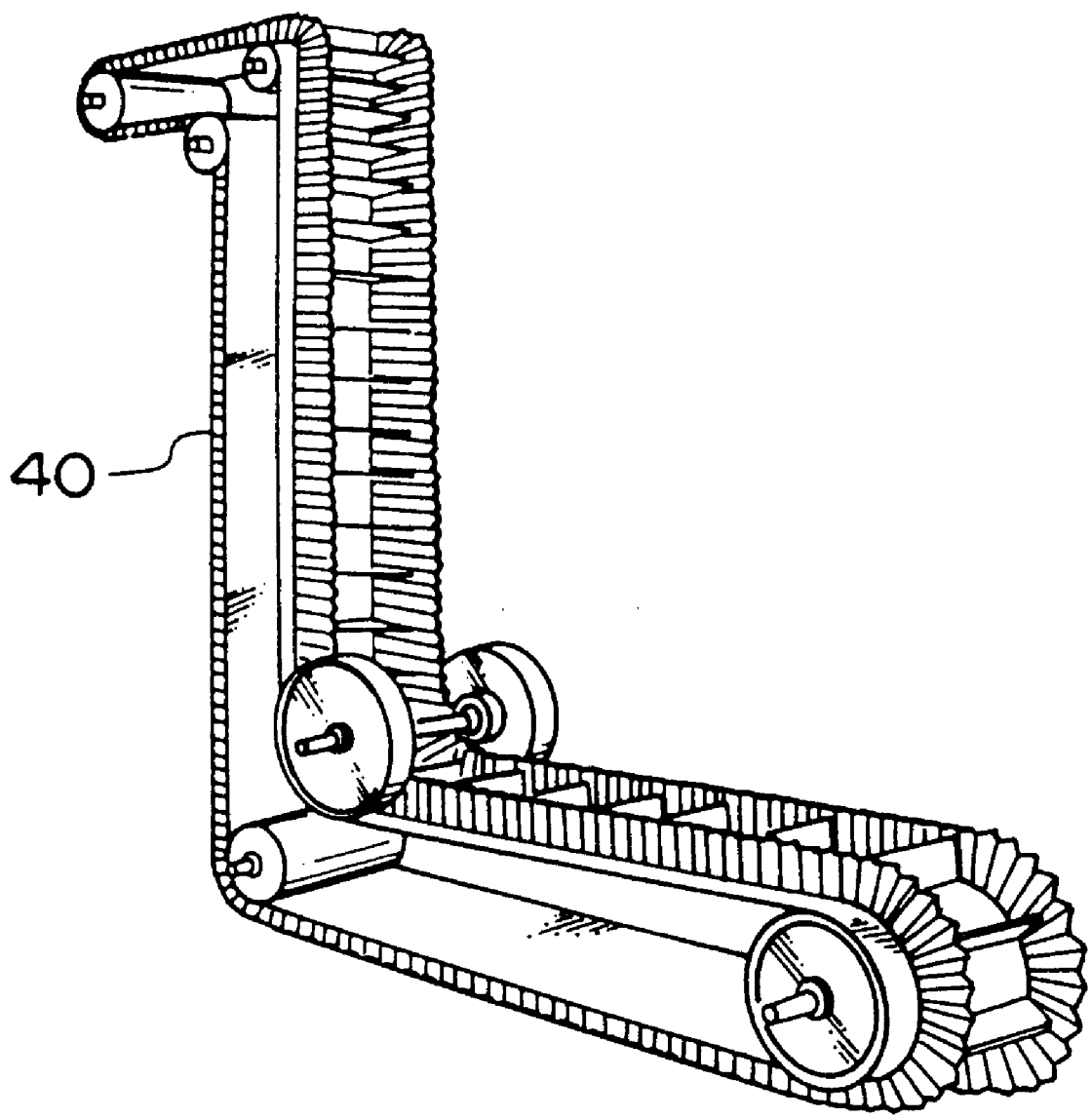
FIG. 13 is a perspective view of a steep slope conveyor belt, showing an example of application of the present invention.
Figure 17:
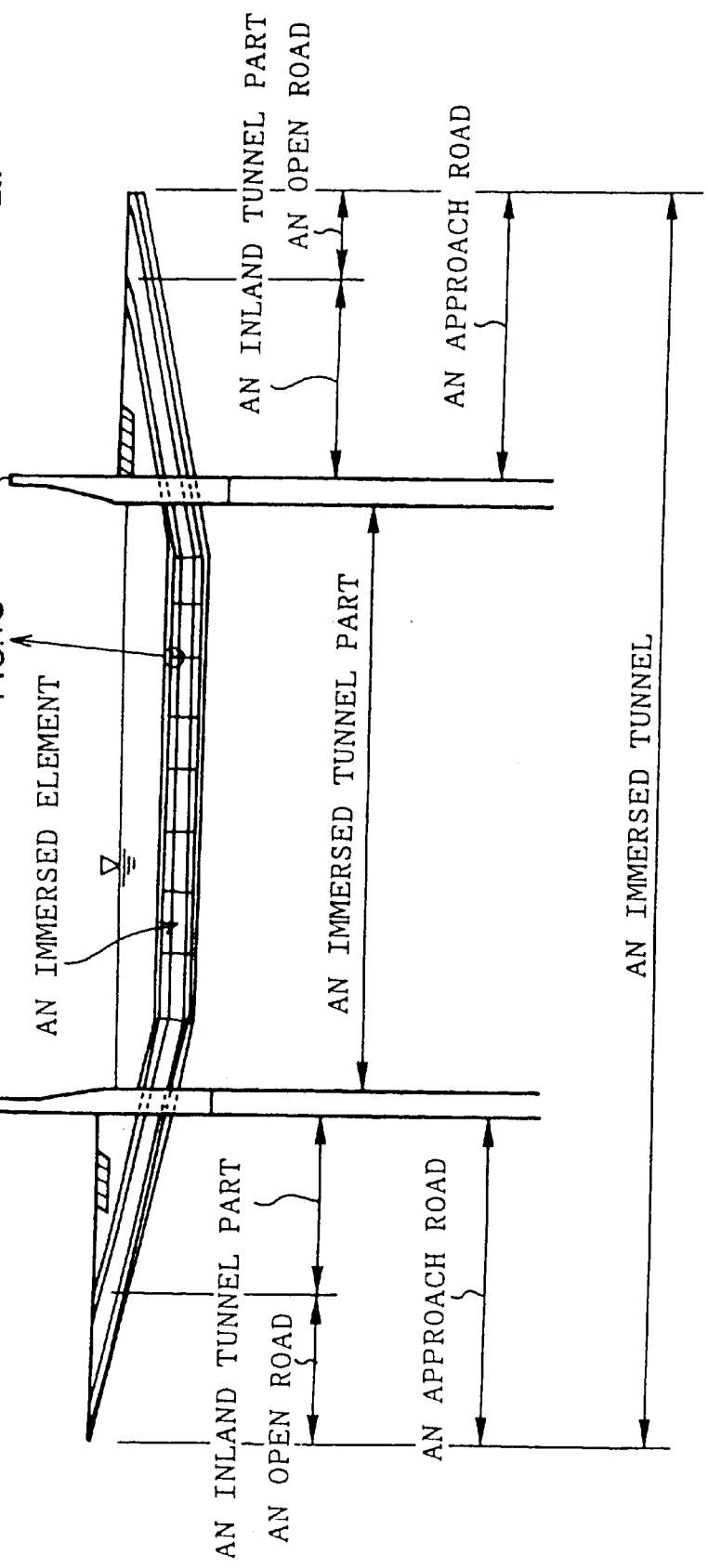
FIG. 17 is a sectional view illustrating an outline of the structure of a whole immersed tunnel.

The resultant steep slope conveyor belt 40 was disposed, for example, in the form shown in FIG. 13, and could transfer a powder material or the like from a lower position to an upper position or from an upper position to a lower position.

As has been shown in detail in the above, an advantage is that a surface suitable for adhesion could be instantaneously obtained by using the process in which a high dense fabric was placed under the surface of the base belt at the part for adhesion in advance, vulcanized together with the rubber, and peeled immediately before adhesion, in place of using the treatment of buffing which is used in conventional processes and requires time and labor. Furthermore, an abrasion resistant rubber could be used as the material for the cover rubber of a base belt, the flange rubber, and the cleat rubber. It is considered to be difficult to treat an abrasion resistant rubber by buffing. As another advantage, formation of defects such as bares could be completely prevented by placing a high dense fabric under the surface when the main body of the base belt was vulcanized. Still another advantage is that the adhesive strength could be further enhanced by inserting, between the base belt and the flange or the cleat, an unvulcanized sheet rubber (a rubber composition for adhesion) containing sulfur in an amount greater than that of the rubbers of the base belt, the flange, and the cleat by 1 to 5 PHR, followed by adhesion of the base belt and the flange or the cleat by vulcanization.

3. A Process for Producing a Rubber Gasket for a Joint Portion of Immersed Elements A process for producing a rubber gasket used for a joint portion of immersed elements which joins immersed elements forming an immersed tunnel to each other in water and serves as a primary seal which seals the tunnel to prevent penetration of water therein, comprises the step of: adhering two or more parts of the gasket of a vulcanized rubber to each other, each part of the gasket having a shape obtained by dividing the rubber gasket in the circumferential direction thereof, the parts of the gasket being adhered to each other at the divided surfaces in accordance with the process for adhering vulcanized rubbers to each other described above.

The adhesion of the parts of the gasket of a vulcanized rubber to each other is conducted in accordance with the process for adhering a vulcanized rubber and a vulcanized rubber described above.

The process for adhering the parts of the gasket to each other comprises the step of: (1) laminating a sheet material to at least one of the rubbers to be vulcanized, before said rubber is vulcanized, on a surface of said rubber which surface is to be used for adhesion and which is a rough surface, said sheet material being easily peelable from said rubber after said rubber has been vulcanized, (2) vulcanizing the resultant laminate of the rubber before vulcanization and the sheet material, (3) removing the sheet material or the sheet material having rubber vulcanizate residue from the vulcanized laminate immediately before adhering the vulcanized rubber in the laminate and a vulcanized rubber in a laminate similar to that described above to each other, and (4) adhering the vulcanized rubbers to each other in accordance with a method of adhesion.

In step (3) described above, a surface suitable for adhesion (a surface similar to that treated by buffing) can be instantaneously obtained by peeling the sheet material from the vulcanized rubber immediately before conducting the adhesion of the vulcanized rubbers to each other.

The method of adhesion is the same as that described above. The adhesion by vulcanization using a rubber composition for adhesion is preferable. When a rubber composition for adhesion is used, it is preferred that the content of sulfur per 100 parts by weight of rubber in the rubber composition for adhesion is greater than the content of sulfur per 100 parts by weight of rubber in the vulcanized rubbers by 1 to 3 parts by weight.

The sheet material is the same as that described above. A fabric or the like material is preferably used.

In the process for producing a rubber gasket for a joint portion of immersed elements described above, adhesion of the parts of the gasket of a vulcanized rubber to each other can be conducted by vulcanizing a laminate formed by inserting a rubber composition for adhesion between the parts of the gasket of a vulcanized rubber. It is preferred that the content of sulfur per 100 parts by weight of rubber in the rubber composition for adhesion is greater than the content of sulfur per 100 parts by weight of rubber in each of the vulcanized rubbers by 1 to 3 parts by weight.

In the adhesion of the parts of the gasket of a vulcanized rubber to each other, a fabric or the like material which can be easily peeled from the vulcanized rubber is placed on the surface of the rubber before vulcanization at the part used for the adhesion later. The remaining surface of the sheet material is covered with a rubber, and then the rubber is vulcanized. By peeling the fabric or the like material from the vulcanized rubber together with the vulcanized rubber covering it after the vulcanization, a rough surface suitable for adhesion which is similar to that obtained by the treatment of buffing in accordance with conventional processes (the treatment of buffing is indispensable in conventional processes) is obtained, and the resultant surface is in a fresh condition.

Therefore, one of the characteristics of the process for adhering the parts of the gasket of a vulcanized rubber to each other is that (1) roughness suitable for adhesion (the anchor effect) and (2) a normal condition (bleedless) can be realized easily on the surface of the vulcanized rubber at least at the part used for adhesion when the surface is formed by peeling the fabric.

Another of the characteristics of the process for adhering the parts of the gasket of a vulcanized rubber to each other is that the adhesion is conducted by inserting between the surfaces of adhesion an unvulcanized rubber composition for adhesion containing sulfur in an amount greater than that of the vulcanized rubber of the gasket rubbers by 1 to 3 parts by weight. When the content of sulfur in the unvulcanized rubber composition for adhesion is the same as or smaller than that of the vulcanized rubber of the gasket part, decrease in modulus is caused by migration of sulfur from the unvulcanized rubber composition for adhesion to the vulcanized rubber, and the adhesive strength is decreased.

The process for production of a rubber gasket for a joint portion of immersed elements is described with reference to an example shown in FIGS. 14A to 18. However, the present invention is, of course, not limited to the example.

EXAMPLE 7

At first, a part of a rubber gasket 51 was prepared by molding. In the preparation, a high dense fabric (made of PET) 52 which could be easily peeled from a vulcanized rubber in a later step was placed under the surfaces of both end parts (refer to FIGS. 14A and 14B). The combined materials were placed in a mold 54 and vulcanized in a vulcanizing press 53 (refer to FIGS. 15A and 15B). In the next step, the high dense fabric 52 placed under the surface for adhesion was peeled. The surface 52a formed by the peeling did not need the treatment of buffing because the surface had a rough shape suitable for adhesion. The surface was also in a fresh condition.

Then, a sheet of rubber composition for adhesion 55 of about 5 to 8 mm thickness containing sulfur in an amount greater than that of the part of the gasket, for example by 2 PHR, was inserted between the surfaces for adhesion of parts of the gasket in such a manner that the sheet covers the whole area of the surface for adhesion. Adhesion of the resultant laminate was conducted by vulcanization (refer to FIG. 16).

Figure 18:
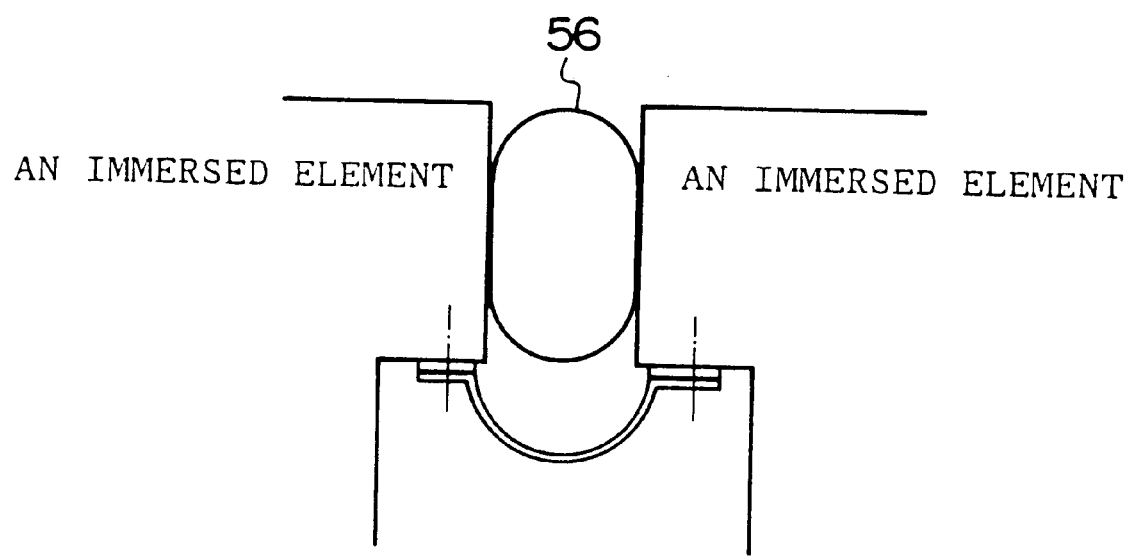
FIG. 18 is an enlarged view of a joint portion of immersed elements.

The rubber gasket 56 for a joint portion of immersed elements prepared by adhesion of the parts as described above was attached to the joint portion in a manner shown in FIG. 18. The rubber gasket exhibited sufficient sealing of the elements to prevent leaking of water (refer to FIG. 17).

The formulations of the rubber compositions used for the rubber gasket and the sheet of the unvulcanized rubber composition for adhesion in the present example are shown in Table 7.

TABLE 7

| material for compounding | rubber for a rubber gasket (part by weight) | unvulcanized rubber composition for adhesion (part by weight) |
| --- | --- | --- |
| NR | 100 | 100 |
| carbon black | 25 | 20 |
| antioxidant | 2 | 2 |
| zinc oxide | 5 | 5 |
| stearic acid | 1 | 1 |
| process oil | 5 | — |
| sulfur | 1 | 3 |
| vulcanization accelerator | 2 | 2 |

As has been shown in detail in the above, an advantage is that a surface suitable for adhesion could be instantaneously obtained by using the process in which a high dense fabric was placed under the surface at the part for adhesion in advance, vulcanized together with the rubber, and peeled at the time of adhesion, in place of using the treatment of buffing which is used in conventional processes and requires time and labor. Another advantage is that the adhesive strength could be further enhanced by inserting, between the parts of the rubber gasket, a sheet of the unvulcanized rubber composition for adhesion containing sulfur in an amount greater than that of the parts of the rubber gaskey by 1 to 3 PHR and bonding the laminate by vulcanization.

4. A Process for Producing a Retreaded Tire

A retreaded tire is produced by adhesion of a vulcanized rubber of a precured tread for a retreaded tire and a vulcanized rubber of a base tire.

The adhesion of the vulcanized rubber of the precured tread and the vulcanized rubber of the base tire is conducted in accordance with the process for adhering vulcanized rubbers to each other described above.

The process for adhering the precured tread and the base tire to each other comprises the step of: (1) laminating a sheet material to the rubber of the precured tread, before said rubber is vulcanized, on a surface of said rubber which surface is to be used for adhesion and which is a rough surface, said sheet material being easily peelable from said rubber after said rubber has been vulcanized, (2) vulcanizing the resultant laminate of the rubber before vulcanization and the sheet material, (3) removing the sheet material or the sheet material having rubber vulcanizate residue from the vulcanized laminate immediately before adhesion of the vulcanized rubber in the laminate to the vulcanized rubber of the base tire, and (4) adhering the vulcanized rubbers to each other in accordance with a method of adhesion.

In step (3), by peeling the sheet material from the vulcanized rubber of the precured tread immediately before adhesion of the vulcanized rubber of the precured tread to the vulcanized rubber of the base tire, a surface suitable for adhesion (a surface similar to that obtained by the treatment of buffing) can be obtained without consuming a large amount of time and labor and without having deterioration of the working environment, which both cannot be avoided in conventional processes.

The method of adhesion is the same as that described above. The adhesion by vulcanization using a rubber composition for adhesion is preferable. When a rubber composition for adhesion is used, it is preferred that the content of sulfur per 100 parts by weight of rubber in the rubber composition for adhesion is greater than the content of sulfur per 100 parts by weight of rubber in the vulcanized rubbers by 1 to 5 parts by weight.

The sheet material is the same as that described above. A fabric or the like material is preferably used.

In the process for producing a retreaded tire, adhesion between the vulcanized rubber of the precured tread and the vulcanized rubber of the base tire can be conducted by vulcanizing a laminate formed by inserting a rubber composition for adhesion between the vulcanized rubbers. It is preferred that the content of sulfur per 100 parts by weight of rubber in the rubber composition for adhesion is greater than the content of sulfur per 100 parts by weight of rubber in the vulcanized rubbers by 1 to 5 parts by weight.

The process for production of a retreaded tire is described with reference to FIGS. 19 to 22. However, the present invention is, of course, not limited to the example.

EXAMPLE 8

Figure 19:
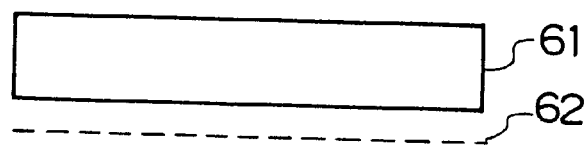
FIG. 19 is a schematic sectional view of a tread before vulcanization.
Figure 20:
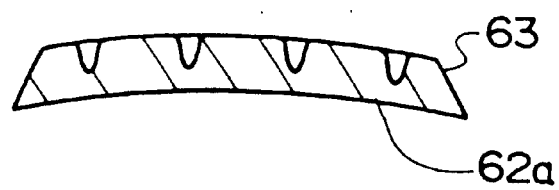
FIG. 20 is a schematic sectional view of a precured tread.

(1) At first, a high dense fabric (made of PET) 62 which could be easily peeled from a vulcanized rubber in a later step was placed under the surface of a tread rubber prepared by using an extruder or the like as is shown in FIG. 19 at least at the part used for adhesion to the base tire. The combined materials were then vulcanized together. After the vulcanization, the high dense fabric placed under the surface for adhesion was peeled. The high dense fabric could be peeled from the vulcanized rubber easily because the high dense fabric have the property of being easily peeled. Thus, a precured tread 63 was obtained as is shown in FIG. 20. The surface 62a formed by the peeling did not need the treatment of buffing because the surface had a rough shape suitable for adhesion.

Figure 21:
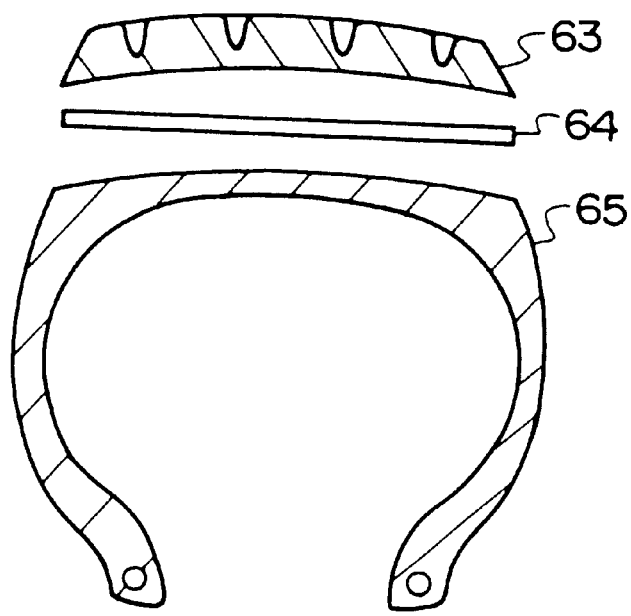
FIG. 21 is a schematic sectional view illustrating components of s retreaded tire at the time of molding in the condition that they are separated.
Figure 22:
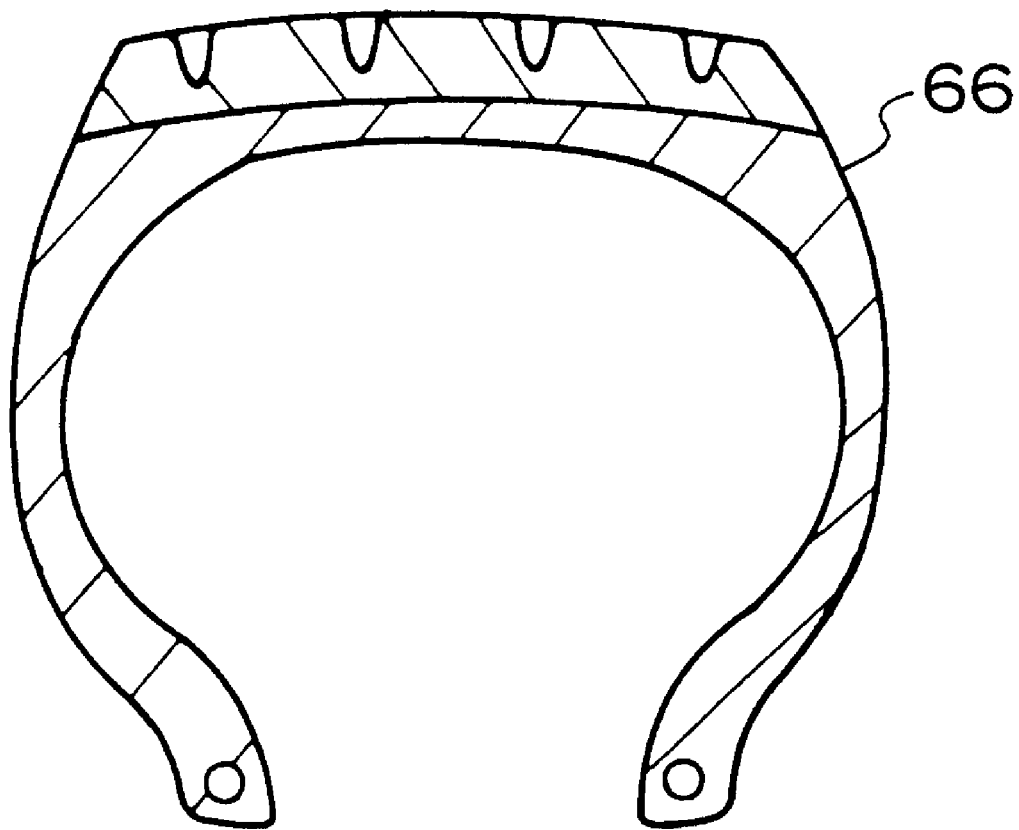
FIG. 22 shows a schematic sectional view of a finished retreaded tire.

Then, a rubber composition for adhesion 64 containing sulfur in an amount greater than that of the vulcanized rubber of the precured tread or the vulcanized rubber of the base tire, for example by 3 PHR, was inserted between the base tire 65 which had been formed to a specified shape by the treatment of buffing or the like and the precured tread 63, as is shown in FIG. 21, and the adhesion was conducted by vulcanization. Thus, a retreaded tire 66 was obtained as is shown in FIG. 22.

The formulations of the rubber compositions used for producing the retreaded tire are shown in Table 8.

TABLE 8

| material for compounding | parts of adhesion of the tread and the base tire (part by weight) | rubber composition for adhesion (part by weight) |
| --- | --- | --- |
| NR | 80 | 100 |
| SBR | 20 | — |
| carbon black | 50 | 50 |
| antioxidant | 2 | 2 |
| zinc oxide | 5 | 5 |
| stearic acid | 3 | 3 |
| process oil | 5 | — |
| sulfur | 2 | 5 |
| vulcanization accelerator | 1 | 1 |

As has been shown in detail in the above, (1) an advantage is that a surface suitable for adhesion could be instantaneously obtained by using the process in which a high dense fabric was placed under the surface of the precured tread at the part for adhesion in advance, vulcanized together with the rubber, and peeled at the time of adhesion, in place of using the treatment of buffing which is used in conventional processes, requires time and labor, and causes a problem on the working environment.

(2) Another advantage is that the adhesive strength could be further enhanced by inserting, between the vulcanized rubber of the precured tread and the vulcanized rubber of the base tire, a sheet of the unvulcanized rubber composition for adhesion containing sulfur in an amount greater than that of the vulcanized rubber of the precured tread or the vulcanized rubber of the base tire by 1 to 5 PHR, and bonding the laminate by vulcanization.

Thus, the simple and rational production of a retreaded tire is enabled by the process described above.

What is claimed is:

1. A process for adhering a vulcanized rubber and an unvulcanized rubber to each other, said process comprising the steps of:

(1) laminating a sheet material to a surface of a first rubber prior to vulcanizing the first rubber to form a laminate, wherein said sheet material is a fabric having a maximum height of surface roughness ($R_y$) of 1 to 5000 μm, which is sufficiently durable under rubber vulcanization conditions and which is easily peelable from the first rubber after the first rubber has been vulcanized;

(2) vulcanizing the laminate;

(3) removing the sheet material or the sheet material having rubber vulcanizate residue from the vulcanized laminate immediately before adhesion of the first vulcanized rubber in the laminate to a second unvulcanized rubber, such that the surface of the first vulcanized rubber is rough and such that the surface is free of buffings from a buffing treatment and free of substances bleeding out from the first vulcanized rubber, which buffings and substances would inhibit adhesion; and (4) adhering the rough surface of the first vulcanized rubber and the second unvulcanized rubber to each other by vulcanization in accordance with a method of adhesion, wherein the method of adhesion is adhesion by vulcanization using a rubber composition for adhesion, the content of sulfur in the rubber composition for adhesion being greater than the content of sulfur in each of the first rubber and the second rubber, and a difference between the content of sulfur per 100 parts by weight of rubber in the rubber composition for adhesion and the content of sulfur per 100 parts by weight of rubber in each of the first rubber and the second rubber being 1 to 10 parts by weight.

2. A process for adhering a vulcanized rubber and an unvulcanized rubber to each other according to claim 1, wherein the fabric of the sheet material is a dense fabric.

3. A process for adhering a vulcanized rubber and an unvulcanized rubber to each other according to claim 1, wherein the method of adhesion includes inserting the rubber composition for adhesion in sheet form between the first vulcanized rubber and the second unvulcanized rubber.

* * * * *